United States Patent [19]
Tseng et al.

[11] Patent Number: 5,930,543
[45] Date of Patent: Jul. 27, 1999

[54] APERTURE SELECTION MECHANISM FOR CAMERA

[75] Inventors: Kou-Long Tseng, Hsinchu; Chien-Chin Chan, ChuPi; Guang-Shang Chang, Taichung; Chih-Wen Pan, Taipei; Chi-Wen Lin, Hsinchu, all of Taiwan

[73] Assignee: Umax Data Systems, Inc, Hsinchu, Taiwan

[21] Appl. No.: 09/097,444

[22] Filed: Jun. 15, 1998

[51] Int. Cl.[6] .................................................. G03B 17/24
[52] U.S. Cl. ............................................................ 396/505
[58] Field of Search .................................. 396/471, 459, 396/485, 505, 380

[56] References Cited

U.S. PATENT DOCUMENTS

| | | | |
|---|---|---|---|
| 2,380,216 | 7/1945 | Carter | 396/505 |
| 2,542,939 | 2/1951 | Cisski | 396/505 |
| 2,662,457 | 12/1953 | Fairbank | 396/459 |
| 4,063,260 | 12/1977 | Toyoshima | 396/505 |
| 5,828,914 | 10/1998 | Balling | 396/380 |

*Primary Examiner*—David M. Gray
*Attorney, Agent, or Firm*—W. Wayne Liauh

[57] ABSTRACT

An aperture selection mechanism for camera lens includes an aperture strip and a disk selection knob. The aperture strip has two or more different sizes of apertures equally spaced from each other and being sequenced by size. Turning the selection knob, the aperture strip will be moved and one of the apertures will be positioned in the light path of the camera lens. Two or more apertures may be moved to the light path of camera lens one at a time so that the camera can produce better quality of photo and image. The structure is simple, low cost and easy to use.

6 Claims, 4 Drawing Sheets

APERTURE SELECTION MECHANISM FOR CAMERA

BACKGROUND OF THE INVENTION

1. Field of the Invention

This invention relates to an aperture selection mechanism for camera lens and particularly to an aperture selection mechanism which has a plurality of different sized apertures for multiple selection of aperture.

2. Description of the Prior Art

Conventional digital camera usually has only two stages apertures for its lens. It increasingly cannot meet high quality requirements of the consumers, particularly for high priced digital cameras. There is a growing need for multiple selections of different sized apertures in digital camera lens so that a higher quality of image and photo may be obtained.

SUMMARY OF THE INVENTION

It is an object of this invention to provide an aperture selection mechanism for camera lens that offers more than two or even four different apertures selection so that higher photo quality can be achieved.

It is another object of this invention to provide an aperture selection mechanism for digital camera lens that is simply constructed, low cost to produce and easy to use.

The aperture selection mechanism according to this invention includes an aperture strip and a disk type selection knob. The aperture strip has a plurality of different size apertures located therein by size sequence. Only one aperture may be positioned in the light path of the lens at any one time. The moving and positioning of the aperture is done by turning the selection knob. Through such structure and arrangement, four or more different size of apertures may be easily included in the aperture strip and made available to the camera lens.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
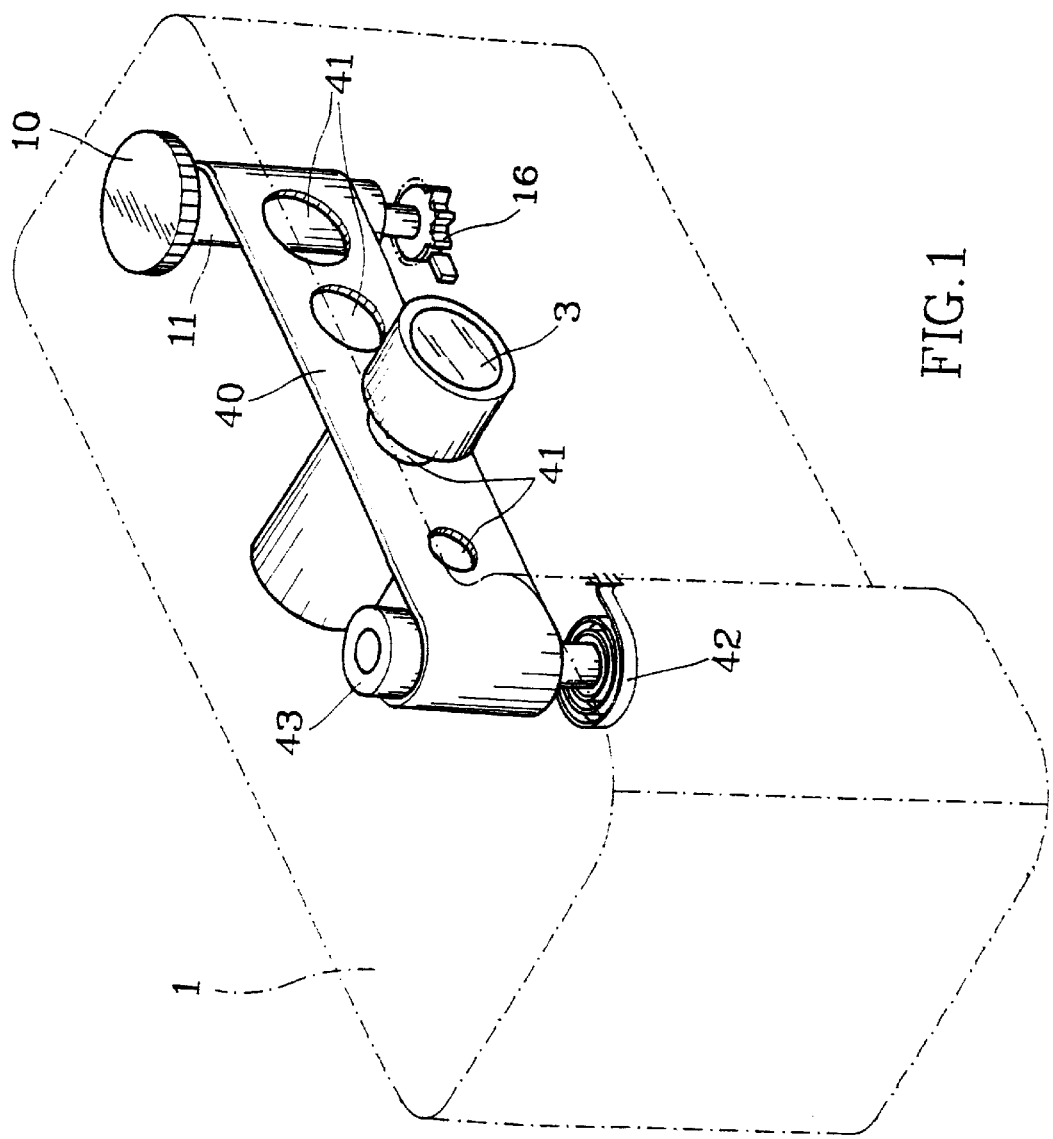
FIG. 1 is a perspective view of a first embodiment of this invention.

Referring to FIG. 1, the aperture selection mechanism according to this invention is located in a digital camera 1. It includes an aperture strip 40, a barrel 43 and a disk type selection knob 10. The aperture strip 40 is made of a flexible material and has a plurality of different sized apertures 41 formed therein. The aperture strip 40 is adjacent the lens 3 and only one aperture may be positioned in the light path of the lens 3 at any one time. The selection knob 10 has a shaft 11 extending at one side for engaging with one end of the aperture strip 40. Another end of the aperture strip 40 engages with the barrel 43. Turning the selection knob 10, the aperture strip 40 will be wound around or released from the shaft 1 1, thus one of the apertures 41 may be moved and positioned in the light path of the lens 3.

One end of the barrel 43 engages with a spiral spring 42 for providing a returning force to wind the aperture strip 40 around the barrel 43 when the selection knob 10 is released. One end of the shaft 1 1 attached a ratchet means 16 which can be turned one way to pull the aperture strip 40 in a direction that unwinds the aperture strip 40 from the barrel 43. Pressing the selection knob 10, the ratchet means 16 will be disengaged from the shaft and the shaft 11 is forced to turn in another direction to allow the aperture strip 40 be wound around on the barrel 43 by the spiral spring 42. By means of such construction, four or more apertures 41 may be provided in the aperture strip 40 and only one of apertures 41 may be selected and positioned in the light path of the lens 3. The whole structure is simple, low cost to make and easy to use.

More embodiments of this invention will be depicted in the follow. Similar parts as the ones set forth above will be indicated by same numerals.

Figure 2:
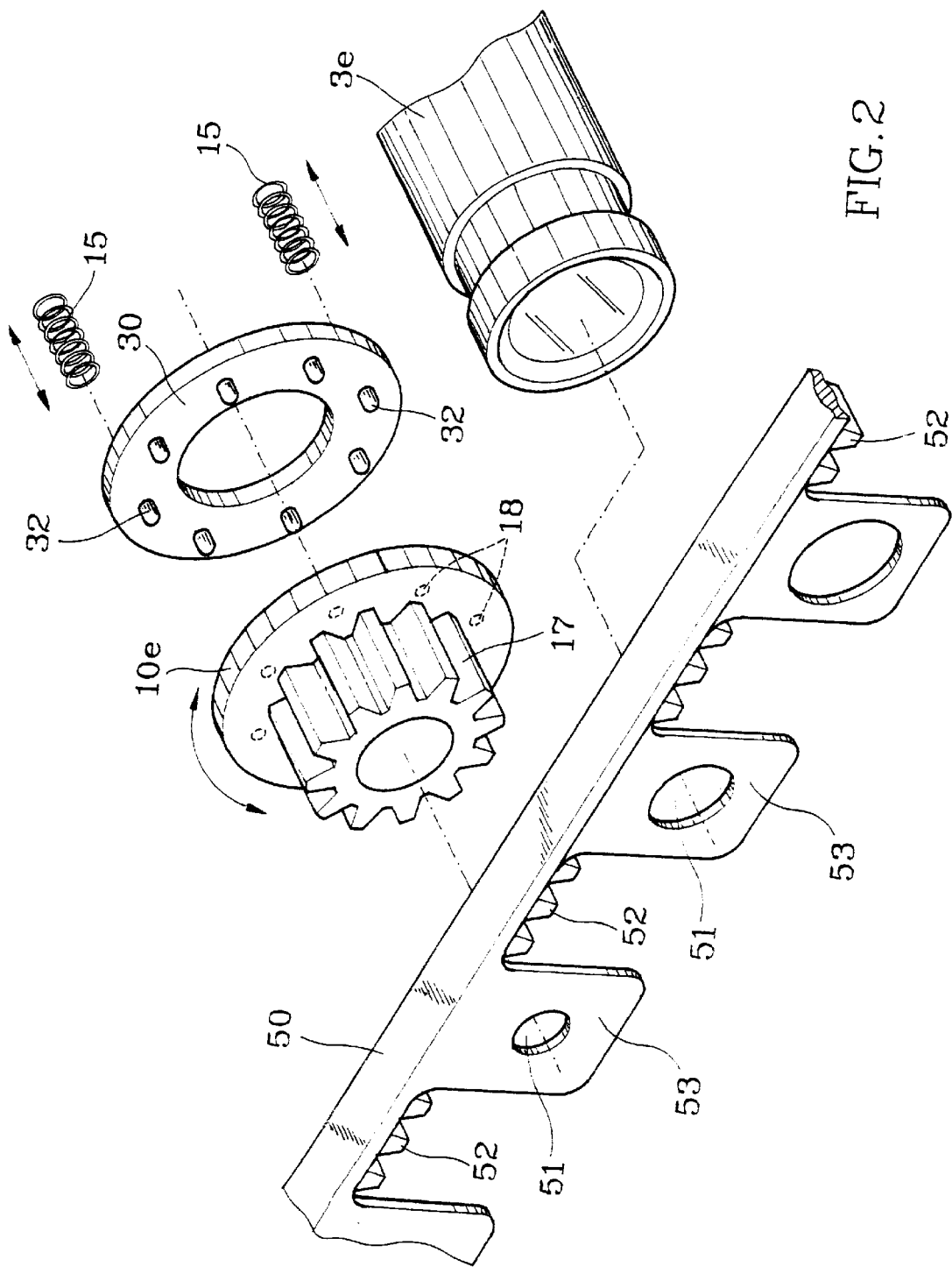
FIG. 2 is an exploded view of a second embodiment of this invention.

FIG. 2 shows a second embodiment of this invention. It includes an aperture strip 50, a positioning disk 30, elastic members 15 and a disk type selection knob 10e. On the aperture strip 50, there are a plurality of aperture frames 53 which are equally spaced from each other. Each aperture frame has a different size of aperture 51 formed therein. Under a lateral side of the aperture strip 50 is furnished with a gear rack 52. On one lateral side of the selection knob 10e, there is provided with a gear 17 engageable with the gear rack 52. Thus when turning the selection knob 10e, the gear 17 will drive the gear rack 52 transversely and move aperture frames 53 so as to align one and only one of the apertures 51 with the light path of the lens 3e.

The elastic members 15 press upon one side of the positioning disk 30 and force the positioning disk making contact with the selection knob 10e. Another side of the positioning disk 30 is provided with a plurality of bulges 32 which are engageable with the concave spots 18 formed on another lateral side of the selection knob 10e. Such structure can make one of the apertures 51 moving precisely in the light path of the lens 3e.

Figure 3:
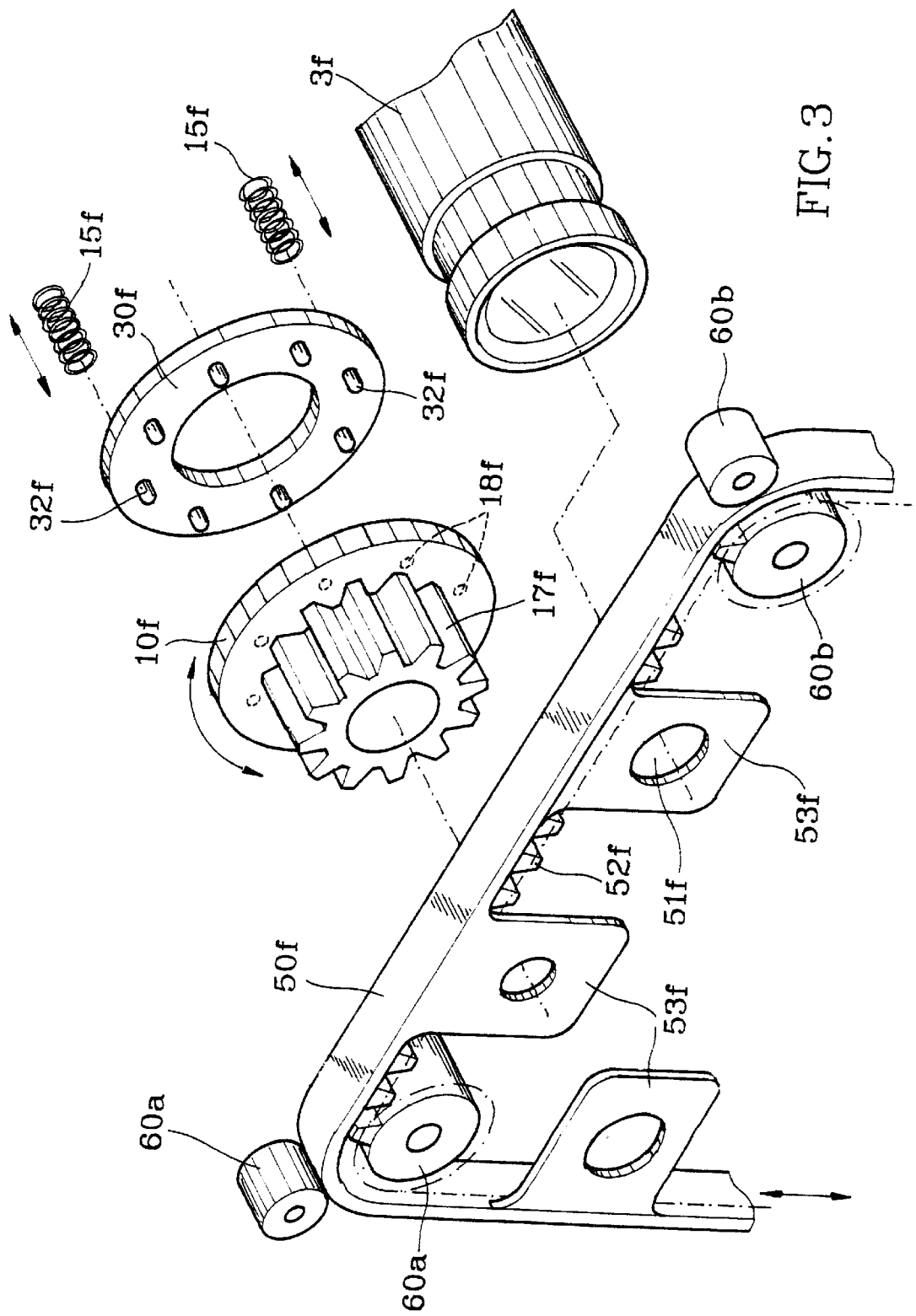
FIG. 3 is an exploded view of a third embodiment of this invention.

FIG. 3 illustrates a third embodiment of this invention. It is constructed largely like the one shown in FIG. 2. It also has a aperture strip 50f with a gear rack 52f, a plurality of equally spaced aperture frames 53f with different sized apertures 51f formed therein, a positioning disk 30f with a plurality of bulges 32f located on one side thereof, a plurality of elastic members 15f pressing the positioning disk 30f at another side, and a selection knob 10f with a plurality of concave spots 18f on one lateral side thereof engageable with the bulges 32f and a gear 17f located on another lateral side thereof engageable with the gear rack 52f. However, in FIG. 2, the aperture strip 50f is made of a flexible material such as rubber or resilient plastics so that it can be flexibly bent in a direction such as about ninety degrees from the transverse direction. Therefore the whole mechanism may be made in a smaller size and become more compact. Two pairs of idlers (or gear wheels) 60a and 60b are provided at the bending corners to facilitate the direction change of the aperture strip 50f.

Figure 4:
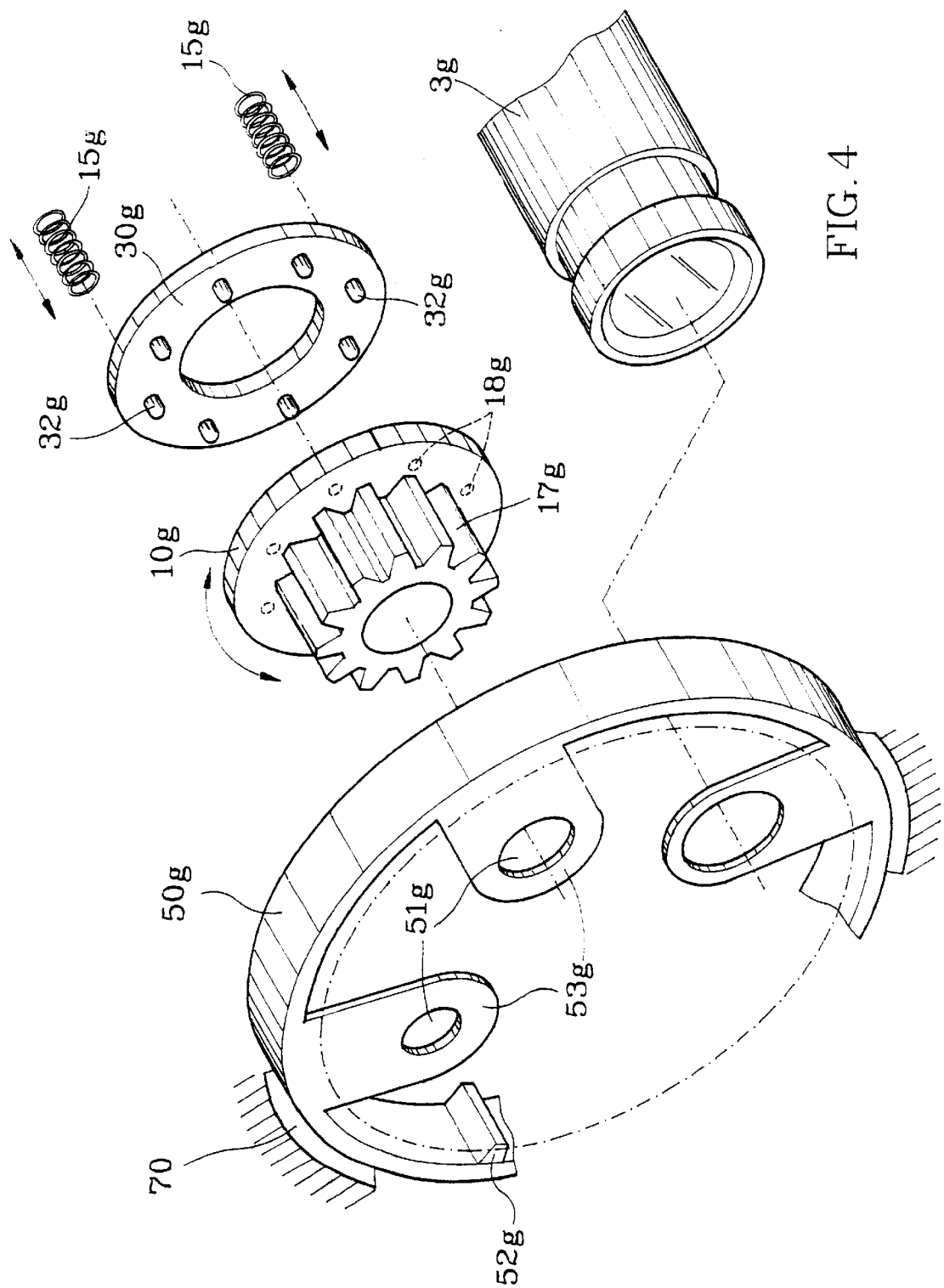
FIG. 4 is an exploded view of a fourth embodiment of this invention.

FIG. 4 shows a fourth embodiment of this invention. It is substantially like the one shown in FIG. 3 except that the aperture strip 50g is formed in a circular ring. Instead of idlers to guide the aperture strip bending, this embodiment uses guiding troughs 70 to channel the aperture strip 50g to move within the desirable limits. All other structure is mostly same as the third embodiment and hence is omitted.

It is to be understood that the descriptions and preferred embodiments set forth are only to serve for illustrative purpose, and do not intent to limit the scope of the present invention. Various changes and modifications may be made without departing from the scope of the present invention.

For instance, the bulges on the positioning disk may be located on the selection knob while the concave spots on the selection knob may be formed on the positioning disk. Instead of a plurality of bulges, only one bulge may be provided and functions equally well. Accordingly, the appended claims are intended to cover all embodiments which do not depart from the spirit and scope of the invention.

What is claimed is:

1. An aperture selection mechanism for camera lens, comprising:

an aperture strip made of a flexible material having a plurality of apertures of different sizes;

a disk type selection knob having a shaft axially attached in the center thereof, the shaft being engageable with one end of the aperture strip; and a barrel spaced from the selection knob and engageable with another end of the aperture strip having at one end thereof engaged with a spiral spring for winding the aperture strip around the barrel when no external force being applied to the aperture strip;

wherein by turning the selection knob, the shaft will move the aperture strip to position one of the apertures to align with the light path of the camera lens.

2. An aperture selection mechanism for camera lens of claim 1 further having a ratchet means located at one end of the shaft for allowing the selection knob to be turned in only one way against the spiral spring for moving the aperture strip; upon pressing the selection knob, the ratchet means will be disengaged with the shaft and the spiral spring will turn the barrel to wind the aperture strip around the barrel.

3. A aperture selection mechanism for camera lens, comprising:

an aperture strip having a plurality of aperture frames equally spaced from each other, each aperture frame having a different size of aperture formed therein, the apertures being sequenced by size; the aperture strip further having a gear rack located on a lateral side thereof; and a disk type selection knob having a gear attached thereon which being engageable with the gear rack for moving one of the apertures to align with the light path of the camera lens.

4. An aperture selection mechanism of claim 3 further having a positioning disk and an elastic member, the positioning disk having a plurality of bulges located on a lateral wall engageable with a plurality of concave spots formed on a lateral wall of the selection knob, the elastic member pressing the positioning disk on another lateral wall to enable the bulges making forced contact with the concave spots.

5. An aperture selection mechanism of claim 3, wherein the aperture strip is made of a flexible material and two pairs of idlers being provided for bending the aperture strip in directions other than transverse direction.

6. An aperture selection mechanism of claim 3, wherein the aperture strip forms in a circular ring and a guiding trough being provided for channeling the aperture strip moving within a predetermined direction and limit.

* * * * *